United States Patent
Schilling

Patent Number: 5,884,901
Date of Patent: Mar. 23, 1999

[54] APPARATUS FOR THREADING ELECTRICAL WIRES INTO FLEXIBLE CONDUIT

[76] Inventor: Daniel R. Schilling, 1543 Hall Acres Dr., Knoxville, Tenn. 37918

[21] Appl. No.: 819,359

[22] Filed: Mar. 17, 1997

[51] Int. Cl.[6] .................................................. B65H 59/00
[52] U.S. Cl. .................................................. 254/134.3 R
[58] Field of Search ................... 254/134.3 R, 134.3 FT; 285/132.1; 29/241

[56] References Cited

U.S. PATENT DOCUMENTS

| | | | |
|---|---|---|---|
| 463,281 | 11/1891 | Libbey | 285/132.1 |
| 1,824,924 | 9/1931 | Paul et al. | 254/139.3 FT |
| 3,110,093 | 11/1963 | Johnson | 29/241 |
| 4,056,859 | 11/1977 | Pace . | |
| 4,518,152 | 5/1985 | Pierce et al. | 254/134.3 R |
| 4,552,338 | 11/1985 | Lindgren . | |
| 4,951,923 | 8/1990 | Couture | 254/134.3 R |
| 5,011,332 | 4/1991 | Kunze et al. . | |
| 5,360,034 | 11/1994 | Manvelian | 285/132.1 |
| 5,431,370 | 7/1995 | Verkuylen et al. . | |

Primary Examiner—Robert C. Watson
Attorney, Agent, or Firm—Pitts & Brittian, P.C.

[57] ABSTRACT

An improved wire threader for threading one or more electrical wires into a flexible split conduit. Improved wire threader (10) includes an elongated first end member (15) defining a graspable member, a second end member (17), and a guide foot (19). The second end member (17) and guide foot (19) are axially aligned. The first end member (15) adjoins the second end member (17) and the guide foot (19) so as to form an obtuse angle with the second end member (17) and an acute angle with the guide foot (19). The first end member (15) and the second end member (17) are hollow elongated tubes, in fluid communication one with the other, each having an open end for electrical wire to travel through. A wire bundle is fed through the first end member (15) and extends out of the second end member (17). The guide foot (19) of the wire threader (10) is then placed into the open end of a flexible split conduit. The terminal end of the wire bundle is held stationary relative to the end of the conduit, wire threader 10 is pulled through the split conduit and additional wire is allowed to feed into first end member 15 of wire threader 10'.

14 Claims, 2 Drawing Sheets

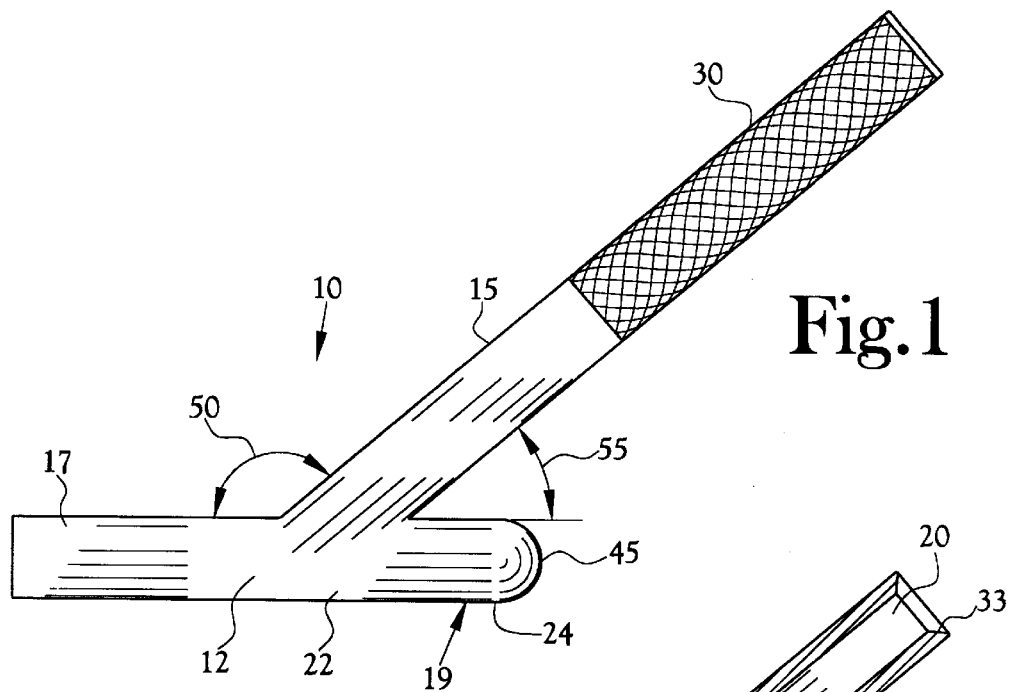
Fig.1
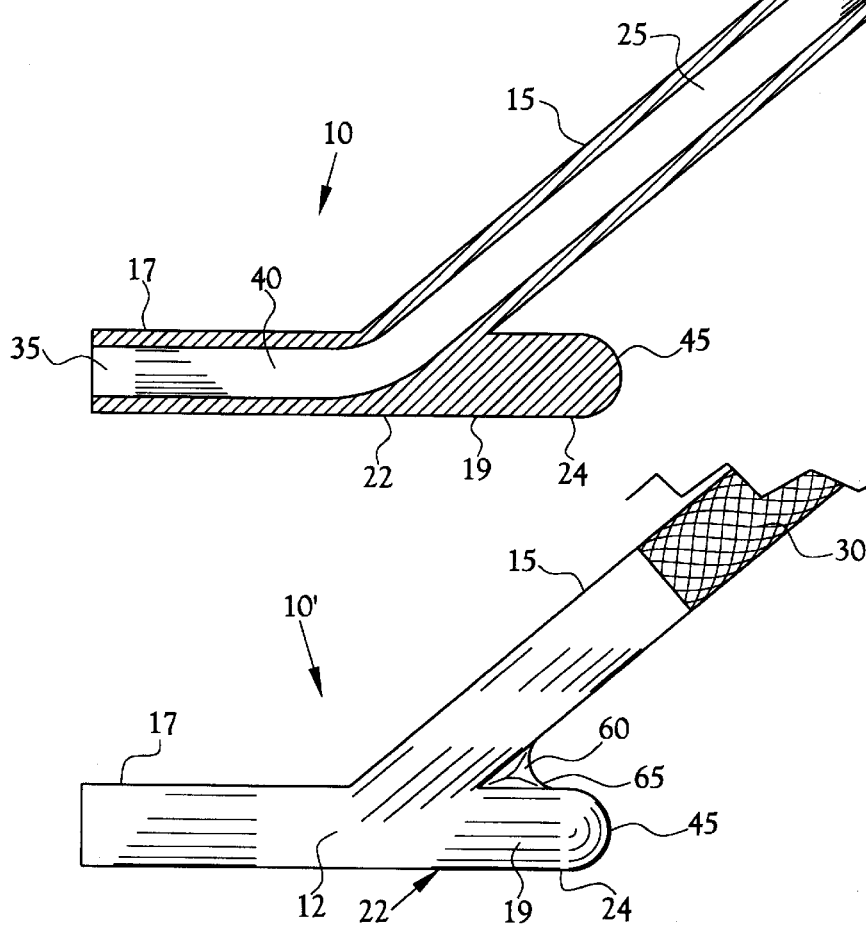
Fig.2
Fig.3

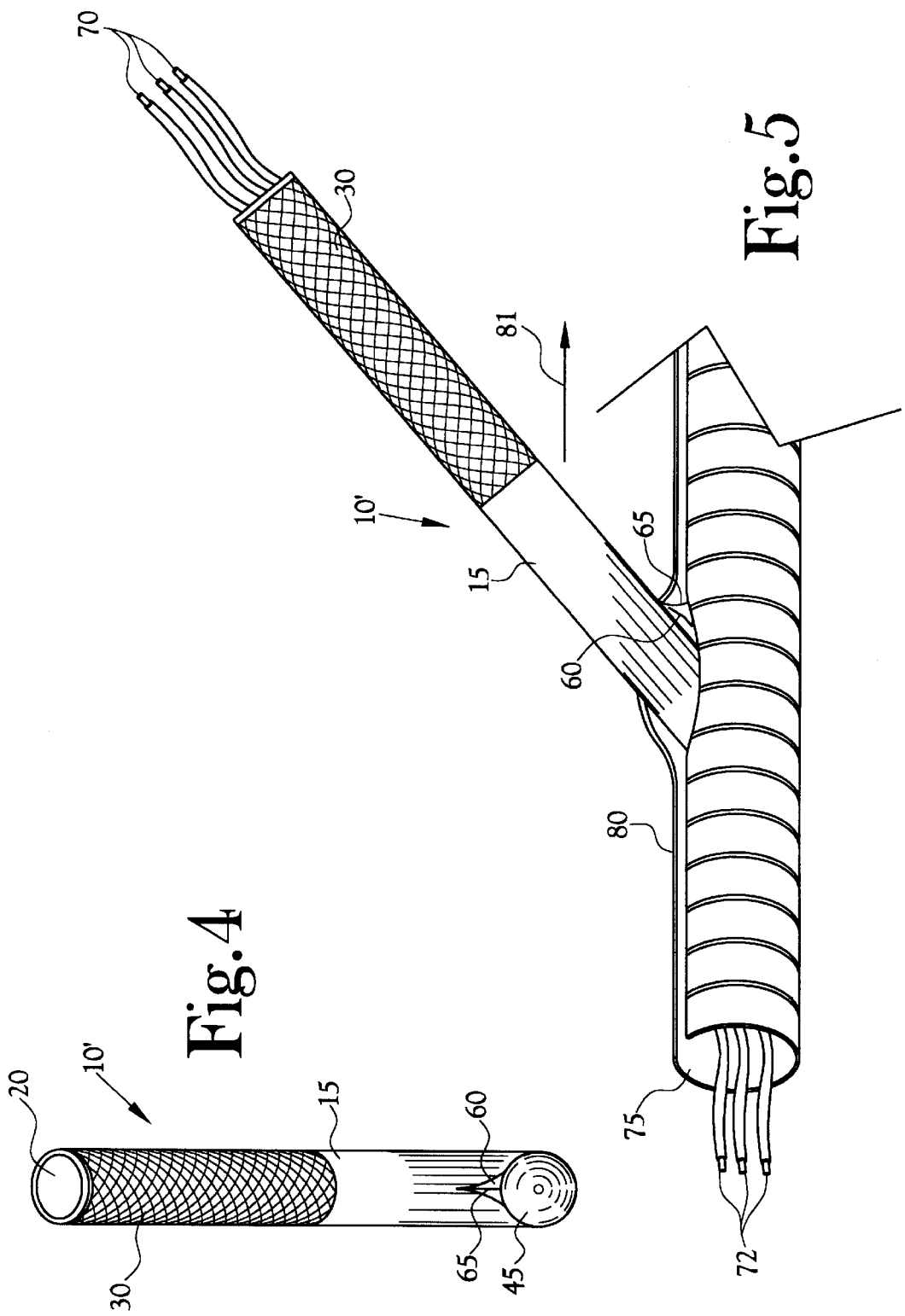

APPARATUS FOR THREADING ELECTRICAL WIRES INTO FLEXIBLE CONDUIT

TECHNICAL FIELD

The present invention relates to a device for threading electrical wire. More particularly it relates to a device for threading a plurality of electrical wires into a split flexible conduit.

BACKGROUND ART

For many electrical applications, it is often desirable to bundle a plurality of wires into a flexible split conduit in order to form a wiring harness. Manually threading numerous electrical wires into the split conduit is very tedious. And, various devices have been invented to assist in pushing or pulling wire, or similarly elongated items through various types of conduits. Examples of such can be found in U.S. Pat. No. 4,056,859 to Pace, U.S. Pat. No. 4,552,338 to Lindgren, and U.S. Pat. No. 5,011,332 to Kunze, et al. U.S. Pat. No. 5,431,370, issued to Verkuylen et al., discloses a fish-tape tugger. This device provides the electrician working on installing electrical wire in conduit a tool for pulling the fish tape back through a conduit once it has been attached to the electrical wire. What is missing in the art, is a device that readily installs a plurality of electrical wires into a flexible split conduit.

Accordingly, it is an object of the present invention to provide an apparatus for threading one or more electrical wires into a flexible split conduit for forming a wiring harness.

A further object of the present invention is to provide such an apparatus that is lightweight.

Still a further object is to provide an apparatus for threading electrical wires into a flexible split conduit that is easily operated and maintained.

Other objects and advantages over the prior art will become apparent to those skilled in the art upon reading the detailed description together with the drawings as described as follows.

DISCLOSURE OF THE INVENTION

In accordance with the various features of this invention, an improved wire threader for threading one or more electrical wires into a flexible split conduit is provided. The wire threader includes an elongated wire guide having a first end member defining a hollow handle member, a second end member defining a hollow terminal end and a guide foot, axially aligned with the second end member. In the preferred embodiment, the first end and the second end are adjoined at an obtuse angle that is approximately 140°. In use, wire is fed through the first end member until it extends out of the second end member. The guide foot of the wire threader is then placed into the open end of a flexible split conduit. Then the terminal end of the wire(s) is (are) held stationary relative to the end of the conduit and the wire threader is pulled through the conduit, while additional wire is allowed to feed into the first end member of the wire threader.

BRIEF DESCRIPTION OF THE DRAWINGS

FIG. 1 is a side elevation view of the device of the present invention.

FIG. 2 is a side elevation view in cross section of the device illustrated in FIG. 1.

FIG. 3 is a side elevation view of an alternate embodiment of the device illustrated in FIG. 1.

FIG. 4 is a rear elevation view of the embodiment depicted in FIG. 3.

FIG. 5 is a perspective view of the device depicted in FIG. 3 in use threading electrical wires into a flexible split conduit.

BEST MODE FOR CARRYING OUT THE INVENTION

An improved wire threader for threading one or more electrical wires into a flexible split conduit constructed in accordance with the present invention is illustrated generally as 10 in the figures. Improved wire threader 10 includes an elongated, angled wire guide member 12 having a first end member 15 defining a graspable handle member, a second end member 17, and a guide foot 19. In the preferred embodiment, second end member 17 and guide foot 19 are axially aligned. Further, first end member 15, preferably, is disposed at an obtuse angle from second end member 17 thus forming a junction with guide foot 19 that defines an acute angle, as best illustrated in FIG. 1. In the preferred embodiment, first end member 15, second end member 17 and guide foot 19 are integrally formed together.

In the preferred embodiment, first end member 15 is a hollow elongated tube having a proximal open end 20 and a hollow axial inlet channel 25. Further, first end member 15 defines a handle and can be provided with knurled region 30 proximate open end 20, in order to provide an enhanced gripping surface. It will be recognized that first end member 15 could be provided with a rubber coating (not shown) for providing an enhanced gripping surface. In the preferred embodiment, open end 20 is provided with an internal chamfer 33 for reducing wear on wire when drawing the wire through the first end member. Preferably, first end member 15 is approximately six inches long.

Similarly, in the preferred embodiment, second end member 17 is a hollow elongated tube having a distal open end 35 and a hollow axial outlet channel 40. Second end member 17 is, preferably, approximately two inches long. As can be seen in FIG. 2, inlet channel 25 and outlet channel 40 are in open communication one with the other and provide a continuous channel extending from open end 20 of first end member 15 to open end 35 of second end member 17 such that electrical wire can easily be pulled through wire guide member 12.

Guide foot 19 has a first end 22 joined to first end member 15 and second end member 17 proximate the junction of first end member 15 and second end member 17 and a second end 24. Guide foot 19 is axially aligned with second end member 17, and in the preferred embodiment, is approximately one inch long. In order to facilitate movement through a flexible split conduit, the second end 24 of guide foot 19 is provided with a rounded closed end 45.

In order to facilitate ease of pulling wire through inlet channel 25 and outlet channel 40, first end member 15 adjoins second end member 17 so as to form substantially obtuse angle 50. Obtuse angle 50 is selected so as to minimize the resistance of pulling a wire bundle through channels 25 and 40 through improved wire threader 10 and is in the range of about 135° to about 145° and, preferably, is approximately 140°.

Referring to FIGS. 3, 4 and 5, an alternate embodiment is illustrated with common components bearing the same reference numerals. Comparable but distinctive parts bear the same reference numeral with the prime notation added, and parts not previously described bear their own reference numerals. In this regard, improved wire threader 10' includes an elongated first end member 15 defining a graspable member, a second end member 17, and a guide foot 19 as described above. As described above, second end member 17 and guide foot 19 are axially aligned. Further, in the preferred embodiment, first end member 15 adjoins second end member 17 and guide foot 19 so as to form an obtuse angle with second end member 17 and an acute angle with guide foot 19. In this alternate embodiment, improved wire threader 10' further includes a separator member 60 disposed proximate the junction of first end member 15 and guide foot 19 in angle 55. Separator member 60 defines a small rigid wedge fixed to first end member 15 and guide foot 19 and having a slightly arcuate leading edge 65 for facilitating the spreading of the flexible split conduit.

In use, a wire bundle, represented by wires 70, is fed through the first end member 15 until it extends out of the second end member 17. Internal chamfer 33 is provided so as to reduce the risk of the internal edge of open end 20 abrading the insulation of the electrical wire. Guide foot 19 of wire threader 10' is then placed into the open end 75 of a flexible split conduit 80. As the terminal ends 72 of the wire(s) are held stationary relative to end 75 of conduit 80, wire threader 10', as illustrated in FIG. 5 is pulled through conduit 80 in the direction of arrow 81, while additional wire is allowed to feed into first end member 15 of wire threader 10'. While FIG. 5 illustrates wire threader 10' in use, it will be understood that wire threader 10 is used in the same manner.

While specific dimensions have been described with respect to the preferred and alternate embodiments, those skilled in the art will recognize that the size of improved wire threader 10 and 10' can be varied, within the scope of the present invention, depending upon the use to which improved wire threader 10 or 10' is being put. For example the described size is adequate for loading three twelve-gauge wires into standard conduit. However if one wished to load larger wires into a larger conduit, one would choose larger dimensions. Contrariwise, if one were loading fine wire into a small conduit, one would choose a much smaller wire threader. The diameter of the threader is selected as a function of the diameter of the conduit, with the outer diameter of the threader being substantially equal to the inner diameter of the conduit.

From the foregoing description, it will be recognized by those skilled in the art that an improved wire threader offering advantages over the prior art has been provided. Specifically, improved wire threader provides an improved apparatus that is lightweight, easily maintained and easily operated for threading one or more electrical wires into a flexible split conduit for forming a wiring harness.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. An improved wire threader for threading at least one electrical wire into a flexible split conduit, said wire threader comprising:

an elongated member having a first end section defining a handle member and a second end section, wherein said first end section and said second end section are disposed one from the other at a selected angle and wherein said handle member is provided with a knurled region proximate said proximal end;

a continuous hollow channel disposed in said elongated member, said channel extending from an opening at a proximal end of said first end member to an opening at a distal end of said second end member, whereby at least one electrical wire can be pulled through said elongated member; and an elongated guide foot member having a first end joined to said first end section and to said second end section proximate said selected angle and axially aligned with said second end section, said elongated guide foot member further having a second end.

2. The improved wire threader of claim 1 wherein said improved wire threader further comprises a wedge insert joined to said first end section and said guide foot member, said wedge insert having a leading edge.

3. The improved wire threader of claim 1 wherein said second end of said elongated guide foot member is rounded.

4. The improved wire threader of claim 1 wherein said selected angle is in an obtuse angle.

5. The improved wire threader of claim 1 wherein said selected angle is in a range of approximately 135° to approximately 145°.

6. The improved wire threader of claim 1 wherein said selected angle is approximately 140°.

7. The improved wire threader of claim 1 wherein said first open end of said first end member is provided with an internal chamfer.

8. An improved wire threader for threading at least one electrical wire into a flexible split conduit, said wire threader comprising:

an elongated member having a first end section and a second end section, wherein said first end section and said second end section are disposed one from the other at a substantially obtuse angle;

a continuous hollow channel disposed in said elongated member, said channel extending from an opening at a proximal end of said first end member to an opening at a distal end of said second end member, said opening at said proximal end includes an internal chamfer, whereby at least one electrical wire can be pulled through said elongated member;

an elongated guide foot member having a first end joined to said first end section and to said second end section proximate said obtuse angle and axially aligned with said second end member, said elongated guide foot member further having a rounded second end; and a wedge insert joined to said first end section and said guide foot member, said wedge insert having a leading edge.

9. The improved wire threader of claim 8 wherein said first end section defines a handle member.

10. The improved wire threader of claim 9 wherein said handle member is provided with a knurled region proximate said proximal end.

11. The improved wire threader of claim 8 wherein said obtuse angle is in a range of approximately 135° to approximately 145°.

12. The improved wire threader of claim 8 wherein said obtuse angle is approximately 140°.

13. An improved wire threader for threading at least one electrical wire into a flexible split conduit, said wire threader comprising:

an elongated member having a first end section and a second end section, wherein said first end section and said second end section are disposed one from the other at a substantially obtuse angle, further wherein said first end section defines a handle member and has an opening at a proximal end, said opening at said proximal end having an internal chamfer, and wherein said second end section has an opening at a distal end;

a continuous hollow channel disposed in said elongated member, said channel extending from said opening at said proximal end to said distal end, whereby at least one electrical wire can be pulled through said elongated member;

an elongated guide foot member having a first end joined to said first end section and to said second end section proximate said obtuse angle and axially aligned with said second end section, said elongated guide foot member further having a rounded second end; and a wedge insert joined to said first end section and said guide foot member, said wedge insert having a leading edge.

14. The improved wire threader of claim 13 wherein said first end section is provided with a knurled region proximate said proximal end.

* * * * *